March 23, 1937.  G. H. HUFFERD ET AL  2,074,748
JOINT
Filed Feb. 26, 1934
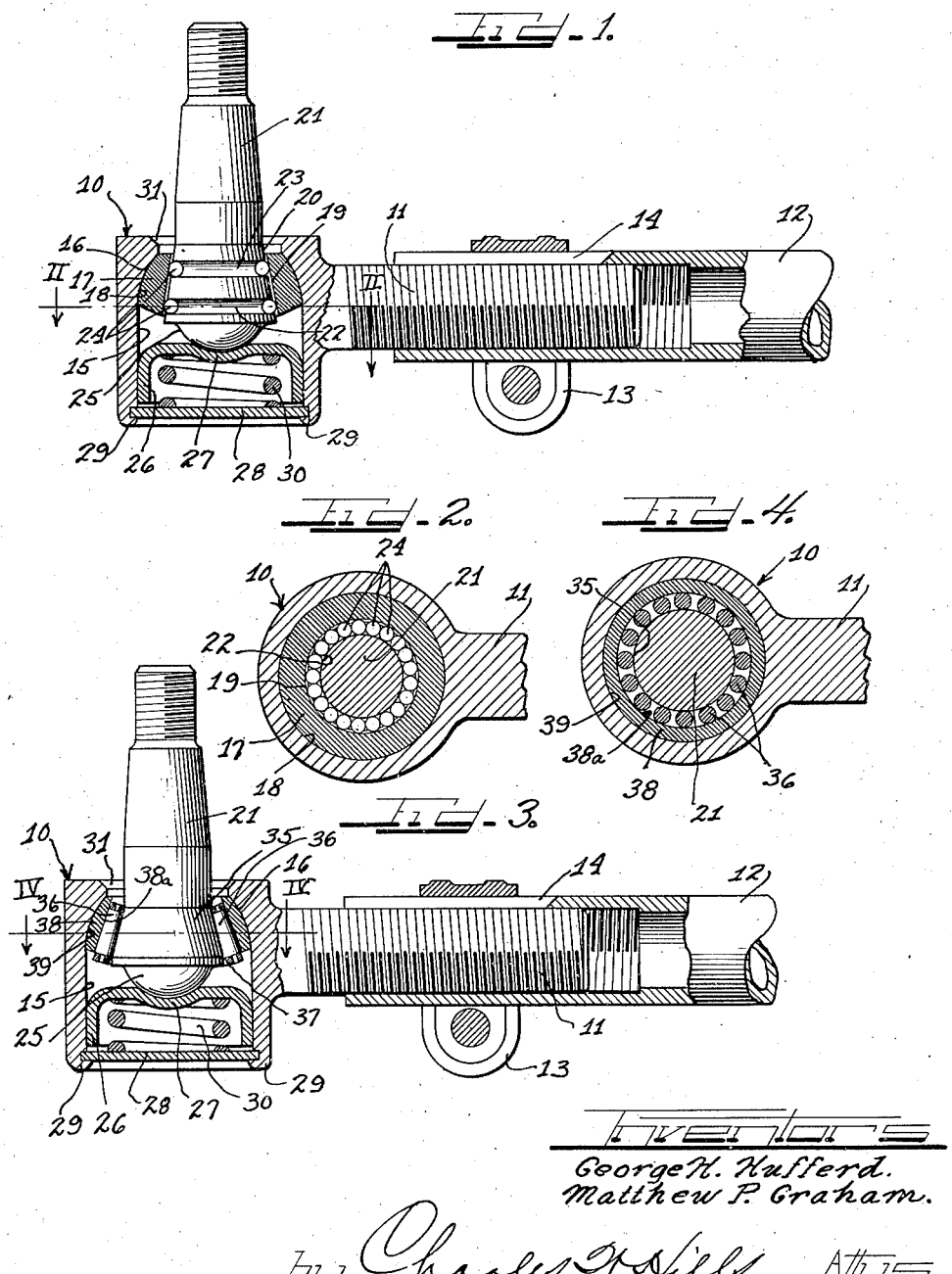
Inventors
George H. Hufferd.
Matthew P. Graham.
by Charles H. Sills Attys.

Patented Mar. 23, 1937

2,074,748

UNITED STATES PATENT OFFICE 2,074,748

JOINT

George H. Hufferd and Matthew P. Graham, Detroit, Mich., assignors to Thompson Products Incorporated, Cleveland, Ohio, a corporation of Ohio Application February 26, 1934, Serial No. 712,904

4 Claims. (Cl. 287—90)

This invention relates to improvements in joint constructions which are particularly adapted for use in tie rod connections in automotive vehicles.

More specifically this invention relates to tie rod joint constructions in which friction is greatly reduced by the incorporation of anti-friction elements.

The invention will be described as incorporated in a tie rod connection, although it is to be understood that the joint construction of this invention is capable of wide use in the mechanical arts.

It is an object of this invention to provide a joint of the class described composed of parts capable of considerable relative angular movement, and of free relative rotary movement.

A specific object of this invention is to provide a tie rod joint for independently mounted front wheel constructions in automotive vehicles permitting a high degree of non-uniform movement without binding.

Another important object of this invention is to provide an anti-friction tie rod joint in which the various parts are automatically self-adjusting to compensate for wear.

Another object of this invention is to provide a trouble proof tie rod joint for independently mounted, or separately sprung front wheels of automotive vehicles capable of transmitting forces without excessive friction.

Another object of this invention is to provide a joint of the class described having anti-friction roller or ball-bearing elements disposed between bearing surfaces of the stud and housing and with auxiliary bearing surfaces arranged so as to operate in the event of failure of the ball or roller bearings, and also containing self-adjusting means to compensate for wear and to prevent lost motion or rattling after continued use.

Other and further objects of this invention will be apparent to those skilled in the art from the following detailed description of the accompanying sheet of drawing illustrating preferred embodiments of my invention.

On the drawing:

Figure 1 is a longitudinal vertical section through an assembled joint construction according to this invention and illustrating portions thereof in elevation.

Figure 2 is a cross-sectional view taken substantially along the line II—II of Figure 1.

Figure 3 is a longitudinal vertical section through another form of assembled joint construction according to this invention and illustrating portions thereof in elevation.

Figure 4 is a cross-sectional view taken substantially along the line IV—IV of Figure 3.

As shown on the drawing:

The reference numeral 10 indicates generally a housing member preferably of forged metal, having a laterally extending shank portion 11 integral therewith and adapted to be inserted into a tie rod 12 or other hollow link connection. The shank 11 is threaded into the tie rod 12 and secured therein by means of a clamp 13. The end of the tie rod 12 is preferably slotted as shown at 14, to permit the clamp 13 to compress the tie rod end around the shank.

The housing has a substantially cylindrical bore 15 therein, provided near the top thereof with a segmental spherical bearing surface 16 engageable with a segmental spherical bearing surface 18 of a seat element 17.

The seat element 17 is provided with a frusto-conical bore having a frusto-conical bearing surface 19, for cooperating, in spaced relation therefrom, with the frusto-conical bearing portion 20 of a stud member 21.

The frusto-conical bearing surface 20 of the stud member 21 may have a pair of annular grooves 22 and 23 cut therein for receiving a plurality of ball-bearings 24 (Figures 1 and 2). The balls 24 rotate freely in the grooves 22 and 23 and engage with the bearing surface 19 of the seat element 17.

The end of the stud 21 beneath the bearing portion 20 is provided with a segmental spherical surface 25. A dished cap 26 having a spherical depressed portion 27 is adapted to be inserted into the open end of the bore 15. A cover plate 28 is placed over the dished cap 26 and the large open end of the housing is peened over as shown at 29 to hold the cover plate 28 therein. A spring 30 is held under compression between the cap 26 and the plate 28 for urging the depressed portion 27 of the cap against the spherical end 25 of the stud member 21. The stud member 21 extends freely through an opening 31 at the top of the housing 10 but is retained in the housing because of the tapered frusto-conical bearing portion 20.

From the above description it is evident that the stud member 21 is freely movable about its own axis because of the free rotary action permitted by the ball-bearings 24. The stud 21 is also freely tiltable through a wide angle by reason of the freedom of relative movement between the seating element 17 and the bearing surface 16 of the housing member. The stud is held in position by means of the spring-retained cap 26. It is obvious that any usual type of washers, caps or seals may be disposed over the opening 31 of the housing to prevent loss of lubricant and ingress of dirt.

In the event that the ball-bearings 24 should fail, the stud member would still have free rotatable movement about its own axis on the frusto-conical bearing surfaces 20 of the stud and 19 of the seat element and/or on the segmental spherical surfaces 18 of the seat element and 16 of the housing.

In Figures 3 and 4 is shown a modification of our invention in which another form of anti-friction means is used in the same type of joint construction shown in Figures 1 and 2. Identical parts have been marked with the same reference numerals.

As shown in Figures 3 and 4, the stud member 21 is provided with a frusto-conical bearing surface 35. Instead of the ball-bearings 24 shown in Figures 1 and 2, a plurality of roller bearings 36, mounted in a carriage 37, are fitted around the bearing portion 35 of the stud member. A seating element 38, having a relatively larger frusto-conical bore than the seating member 17 shown in Figures 1 and 2, provides a bearing surface 38a for the roller bearings 36. The seating element 38 has an outside segmental spherical surface 39 contacting the surface 16 of the housing and is mounted in the housing 10 in the identical manner shown in Figures 1 and 2. It is obvious, in this construction also, that in the event of the failure of the anti-friction bearings, the stud 21 is adapted to rotate about its own axis on the conical bearing surfaces 35 of the stud and 38 of the seating element 37 and/or on the segmental spherical surface 39 of the seating element 37 and the segmental spherical surface 16 of the housing.

The improved joint construction described above has many advantages, principal among which is the elimination of any substantial friction between the moving parts and the safety factor permitting other bearing surfaces to come into action in the event of failure of the anti-friction elements. The rotation of the stud about its own axis is independent of any degree of frictional resistance to a tilting or angular movement.

The taper of the frusto-conical bearing portion of the stud member 21 may be varied throughout a wide range. It is evident that if the angle of taper be increased, the frictional component of the force of the spring-urged cap 26 is greater than when the bearing surfaces approach a straight cylindrical shape. The anti-friction elements interposed between the frusto-conical bearing surfaces of the stud and the inside of the seat element largely eliminate friction between the stud and the housing but if it is desired to somewhat increase the friction to resist rotary movement of the stud about its own axis, the taper of the bearing surface may be increased, as pointed out above, to resist a turning movement.

At the same time, the spring pressure against the stud end contributes directly to the resistance of the stud against angular or tilting movement. While the anti-friction elements tend to eliminate friction between the stud and housing in rotary movement of the stud about its own axis, the tilting or angular movements about the stud can be resisted directly by increasing the spring pressure.

The wide range of tilting action permitted by the tie rod joint of this invention renders the joint particularly useful in automotive vehicles having independently sprung front wheels each provided with an individual tie rod. In the tie rod ball joints of the prior art, the same set of bearing surfaces took care of both rotary and angular or tilting movement and therefore no independent adjustment of the degree of frictional resistance to the two movements was possible. However, in the tie rod joints of this invention, as pointed out above, the two types of movement are borne by separate bearing surfaces which can be separately adjusted.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. A joint comprising a stud having a frusto-conical bearing portion and a segmental spherical end, a housing having an inner segmental spherical bearing surface, a seat member disposed between said stud and housing having an outer segmental spherical bearing surface engaging the bearing surface of said housing and an inner frusto-conical bearing surface spaced from said stud, anti-friction bearing means between said stud and said seat member, a movable member slidably mounted in the housing having a depressed segmental spherical portion for receiving the end of said stud, spring means urging said movable member against said stud end and a retaining cover for said spring means secured in said housing.

2. A joint comprising a housing having an inner segmental spherical bearing surface, a stud having a tapered bearing surface, a plurality of roller bearings disposed around said tapered bearing surface, a seating element having an inner tapered bearing surface engaging with said roller bearings and an outer segmental spherical bearing surface engaging said housing bearing surface, a rounded end portion on said stud and a spring urged cap engaging said end to hold the stud and seat element in operative position within the housing.

3. In a joint having a housing with inside walls defining at one end thereof a segmental spherical bearing surface, a stud extending freely from said housing having a tapered bearing portion and a rounded end extending therebelow disposed in said housing, a seating element disposed around the stud bearing portion having an external segmental spherical bearing surface for co-operating with the housing bearing surface and an internal tapered bearing surface converging in the same direction as the bearing surface of the stud, the combination of anti-friction elements rotatably mounted between the stud bearing surface and the internal bearing surface of the seating element, a cap slidably mounted in the housing having a depressed central portion for receiving the rounded end of the stud, and spring means urging said cap against the stud end for maintaining the joint elements in proper bearing engagement.

4. A joint comprising a stud having a frusto-conical head portion and a rounded end surface below said head portion, a housing having an inner segmental spherical bearing surface, a seat member disposed between said stud head and housing having an outer segmental spherical bearing surface engaging the bearing surface of said housing and an inner frusto-conical bearing surface spaced from the stud head, said stud head, bearing surfaces of the seating element and bearing surface of the housing converging in the same general direction, anti-friction bearing means between said stud head and said seat member, a retainer member slidably mounted in the housing having a central portion thereof in bearing engagement with the rounded end surface of the stud, spring means urging said retainer member against said stud surface in the direction of convergence of said bearing surfaces of the stud head, seating element and housing and a retainer cover for said spring means secured in said housing.

GEORGE H. HUFFERD.
MATTHEW P. GRAHAM.